US008769885B2

(12) United States Patent
Lamotte

(10) Patent No.: US 8,769,885 B2
(45) Date of Patent: *Jul. 8, 2014

(54) AWNING BRACKETS AND PANEL

(71) Applicant: Dennis Lamotte, Ashland City, TN (US)

(72) Inventor: Dennis Lamotte, Ashland City, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 13/913,986

(22) Filed: Jun. 10, 2013

(65) Prior Publication Data

US 2013/0333307 A1   Dec. 19, 2013

Related U.S. Application Data

(63) Continuation of application No. 13/189,712, filed on Jul. 25, 2011, now Pat. No. 8,458,964.

(60) Provisional application No. 61/367,606, filed on Jul. 26, 2010.

(51) Int. Cl.
*E04B 7/16* (2006.01)
*E04B 1/34* (2006.01)

(52) U.S. Cl.
USPC ............. 52/74; 52/36.4; 108/108; 211/90.01; 211/103; 248/273

(58) Field of Classification Search
USPC .................. 52/36.4, 73, 74, 75, 78, 702, 781; 248/273; 108/108; 211/87.01, 90.01, 211/103, 190, 207
See application file for complete search history.

(56) References Cited

U.S. PATENT DOCUMENTS

| | | | | | |
|---|---|---|---|---|---|
| 2,602,972 | A | * | 7/1952 | Chalfant | 49/86.1 |
| 2,736,933 | A | * | 3/1956 | Olsen | 52/74 |
| 2,824,341 | A | * | 2/1958 | Stewart et al. | 52/222 |
| 2,957,483 | A | * | 10/1960 | Dunn | 160/89 |
| 3,027,823 | A | * | 4/1962 | Martin | 454/224 |
| 3,593,470 | A | * | 7/1971 | Francis | 52/36.4 |
| 3,911,633 | A | * | 10/1975 | Bamberger | 52/75 |
| 5,005,332 | A | * | 4/1991 | Brugman | 52/473 |
| 5,737,874 | A | * | 4/1998 | Sipos et al. | 49/67 |
| 6,796,359 | B1 | * | 9/2004 | Knutson | 160/156 |
| 2002/0033190 | A1 | * | 3/2002 | Muller | 136/244 |

* cited by examiner

*Primary Examiner* — Brian Glessner
*Assistant Examiner* — Brian D Mattei
(74) *Attorney, Agent, or Firm* — Wayne Edward Ramage; Baker Donelson

(57) ABSTRACT

An apparatus and system to removably install, or replace, an awning panel. The awning panel is mounted on a wall or structure or similar vertical surface by insertion into a pair of mounting brackets that have been affixed to the wall. The mounting brackets may be mounted at any distance apart, and thus may accommodate awnings of different sizes. The mounting brackets comprise a right and left bracket, each comprising an angled support art, a holding member, a vertical support member, and a top support member. Supporting members along the sides of the awning panel slide into the space or slot formed by the angled support arm and the holding piece, and is further supported by the angled support arm extending along the underside of the supporting members. The angled support arm may be fixed at a set angle, or may be adjusted to different angles. A cover panel may be used to shield the awning panel, with the cover panel mounted on separate brackets or on the same brackets with the awning panel.

13 Claims, 19 Drawing Sheets

AWNING BRACKETS AND PANEL

This application is a continuation application of U.S. application Ser. No. 13/189,712, filed Jul. 25, 2011, which claims benefit of and priority to U.S. Provisional Application No. 61/367,606, filed Jul. 26, 2010, by Dennis Lamotte, and is entitled to those filing dates for priority in whole or in part. The specifications, figures and complete disclosures of U.S. Provisional Application No. 61/367,606 and U.S. application Ser. No. 13/189,712 are incorporated herein by specific reference for all purposes.

FIELD OF INVENTION

The present invention relates to a system and apparatus for mounting awnings. More specifically, the present invention relates to a system and apparatus for removably mounting one or more awning panels.

BACKGROUND OF THE INVENTION

The use of awnings to provide shade and cover is well known in the art. Awnings have been used as coverings since Roman times. Currently, awnings provide a high quality and decorative curb appeal to homes, offices or commercial establishments. Typically, awning frames are made of aluminum or steel, and manufactured installed by local manufacturing companies. Examples of awnings, frames and installation methods are disclosed in U.S. Pat. Nos. 7,740,044; 7,730,924; 7,728,542; 7,699,091; 7,628,194; 7,604,036; 7,568,491; 7,556,079; 7,302,988; 7,281,560; 7,207,369; 7,065,934; 7,044,189; 6,938,389; 6,446,917; 6,315,025; 6,267,130; 6,142,438; 6,032,909; 5,819,830; 5,562,143; 5,148,640; and 4,821,987; all of which are incorporated herein in their entireties by specific reference for all purposes.

However, current awning systems are complex, and difficult and expensive to mount, both for the initial installation and subsequent replacement. Accordingly, what is needed is a device and system to inexpensively and easily mount and replace awnings by the homeowner or user.

SUMMARY OF INVENTION

In various embodiments, the present invention comprises an apparatus and related methods to removably install, or replace, an awning. In one exemplary embodiment, the awning comprises a panel made of canvas, vinyl, plastic, metal, aluminum, wood, glass, tempered glass, vinyl siding, shaker shingles, thatched roofing, wire, or other suitable material. The panel may be colored, translucent, painted, or otherwise decorated, and may include logos, words, names, pictures, graphics, or the like. In one embodiment, a picture or other image may be printed onto a vinyl panel and transferred to an awning frame for mounting as described below. In yet another embodiment, the panel may be transparent or translucent (e.g., glass), and graphics may be removably placed on the panel with a Mylar film or similar film or material.

In a typical embodiment, the panel is stretched (if made of a stretchable material) and mounted on a frame. Where the panel is made of inflexible materials, such as glass or wood, a frame may be used but may not be needed. The exact configuration of the frame varies according to the dimensions and characteristics of the panel, but generally comprises at least a rectangular shape with supporting members (such as rods, beams, or poles) extending along or near the sides of the panel. In one embodiment, supporting members extend only along the right and left side of the panel.

The awning is mounted on a wall or structure or similar vertical surface by insertion into a pair of mounting brackets that have been affixed to the wall. The mounting brackets may be mounted at any distance apart, and thus may accommodate awnings of different sizes. The mounting brackets comprise a right and left bracket. In the embodiment shown, each mounting bracket is a mirror image of the other. A mounting bracket comprises an angled support arm. All or a portion of the upper part of the support arm may be covered or topped with a holding piece or member. The holding piece may be an open or closed triangular piece, or a rod or similar member extending from the support arm. The supporting members along the sides of the awning panel slide into the space or slot formed by the angled support arm and the holding piece, and is further supported by the angled support arm extending along the underside of the supporting members. The holding piece may be integral with the support arm.

In one embodiment, the angled support arm is fixed at a set angle. The fixed angle may vary. In another embodiment, the support arm can be moved or adjusted to different angles, including up to 90 degrees, or beyond.

The awning panel may be held in place after insertion by any acceptable means, including, but not limited to, a spring lock inserted in a hole on the side of the support arm and into a hole of the panel frame. Alternatively, a spring or pressure mechanism along the inside of the support arm may be used, or a lining. In one exemplary embodiment, a rubber lining or strip may be used for a tight fit with the panel. The awning panel may be removed by reversing any holding mechanism, and drawing the panel out of the brackets.

In one exemplary embodiment, the mounting bracket further comprises a top support extending horizontally along the wall or vertical surface above the door, window or space under the panel. A plurality of holes may be located in the top support for mounting to the wall or vertical surface. The mounting bracket may further comprise a vertical support extending vertically down the wall or vertical surface, alongside the door, window or space under the panel. A plurality of holes may be located in the vertical support for mounting to the wall or vertical surface. A brace support extending between the vertical support and the angled support arm may be used to provide additional support.

Another exemplary embodiment comprises a non-fading cover shield placed above the awning, shading the awing material underneath and preventing premature fading. During winter months or other times with less sun or heat, the cover shield can be removed. A double pair of mounting brackets, right side and left side, may be used to mount an awning with a cover. A pair of brackets on one side comprises an awning mounting bracket for the awning panel, as described above, with a cover mounting bracket affixed to the wall or vertical surface above the awning mounting bracket. The configuration of the cover mounting bracket is similar to the awning mounting bracket, with an angled support with a holding piece. The cover shield is inserted into the cover mounting brackets in the manner described for awnings above.

The cover mounting bracket may be affixed to the wall or vertical surface separately from the awning mounting bracket. In one alternative embodiment, the cover mounting bracket may be placed directly above the corresponding awning mounting bracket. In yet another exemplary embodiment, the cover mounting bracket is offset from the awning mounting bracket. The cover shield may be larger than the awning and extend over the awning on the sides. In another exemplary embodiment, the cover mounting bracket may be affixed, connected to, or supported by the awning mounting bracket. The cover mounting bracket may be integrated with the awning mounting bracket, or it may fit into a receiving cup, slot, or holder.

In yet another embodiment, multiple brackets may be used, so that two, three, or more awning panels can be mounted over each other, in whole or in part (i.e., stacked vs. offset or overlapping). As with the double brackets, the brackets on one side may be separate, detachably connected, or integrated.

The brackets may be sold separately from each other or from awning panels. Once installed, the user can then easily install and replace awnings as desired. The user can have cheap and inexpensive replacement awnings manufactured easily, such as a thin vinyl that can be stretched over a frame. The awning panel being removed can be removed from its frame, and the frame used with the new awning panel. The cover shield also may be removed and replaced in a similar manner to the awning.

BRIEF DESCRIPTION OF THE DRAWINGS

FIG. 19 shows a view of an awning bracket with movable support arm.

DETAILED DESCRIPTION OF EXEMPLARY EMBODIMENTS

Figure 1:
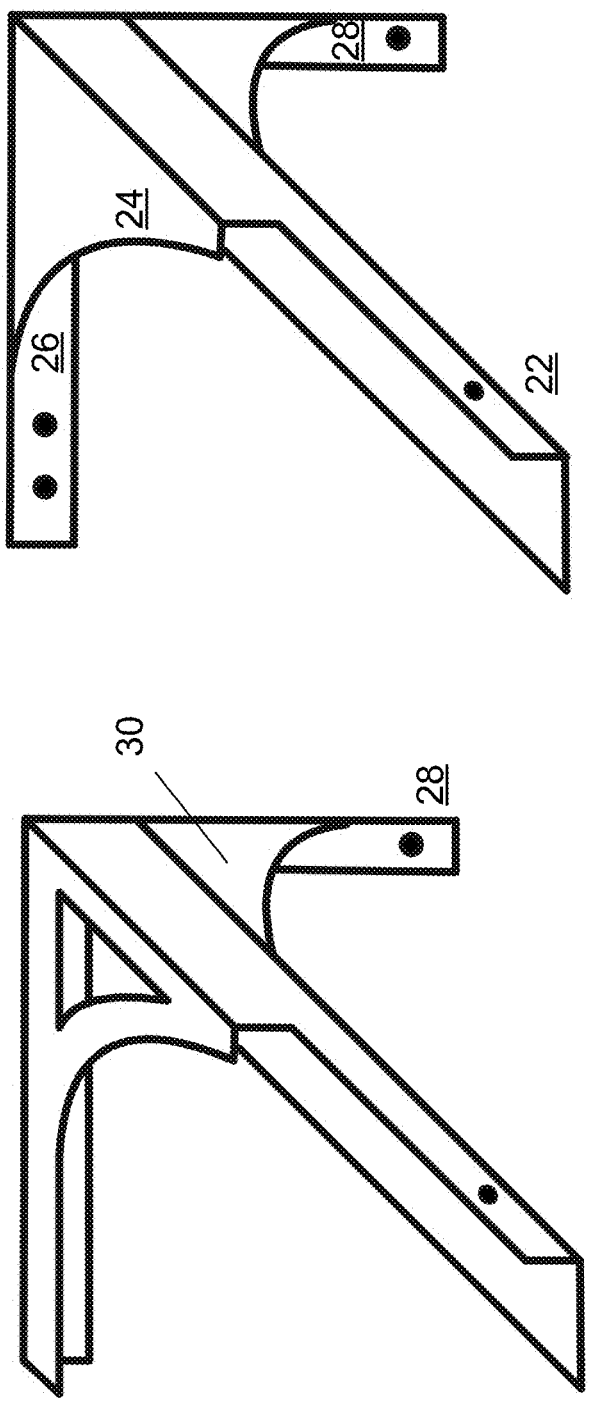
FIG. 1 shows several views of an awning bracket in accordance with an embodiment of the present invention.
Figure 2:
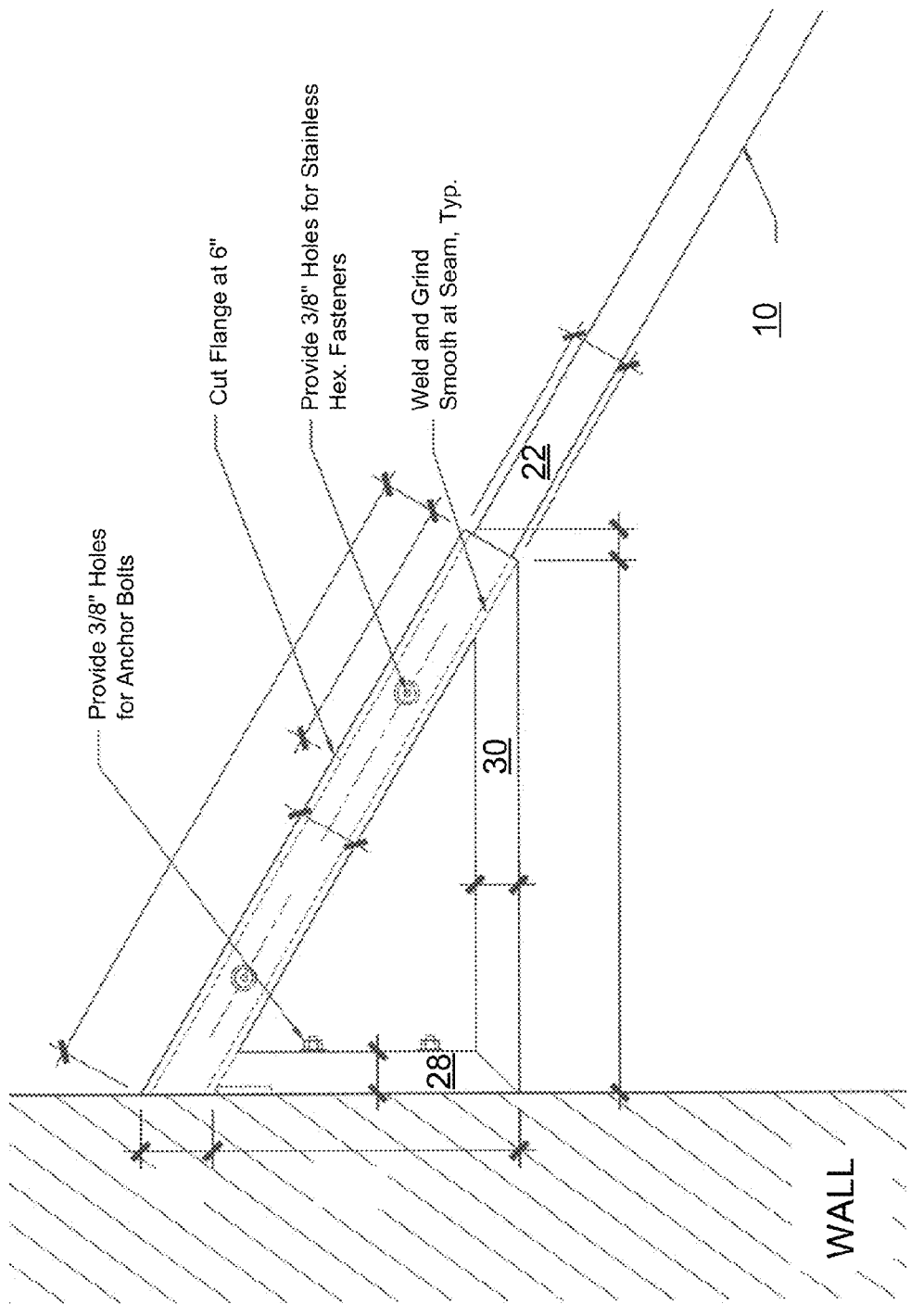
FIGS. 2 through 7 show views of two awning brackets as shown in FIG. 1 in use.
Figure 3:
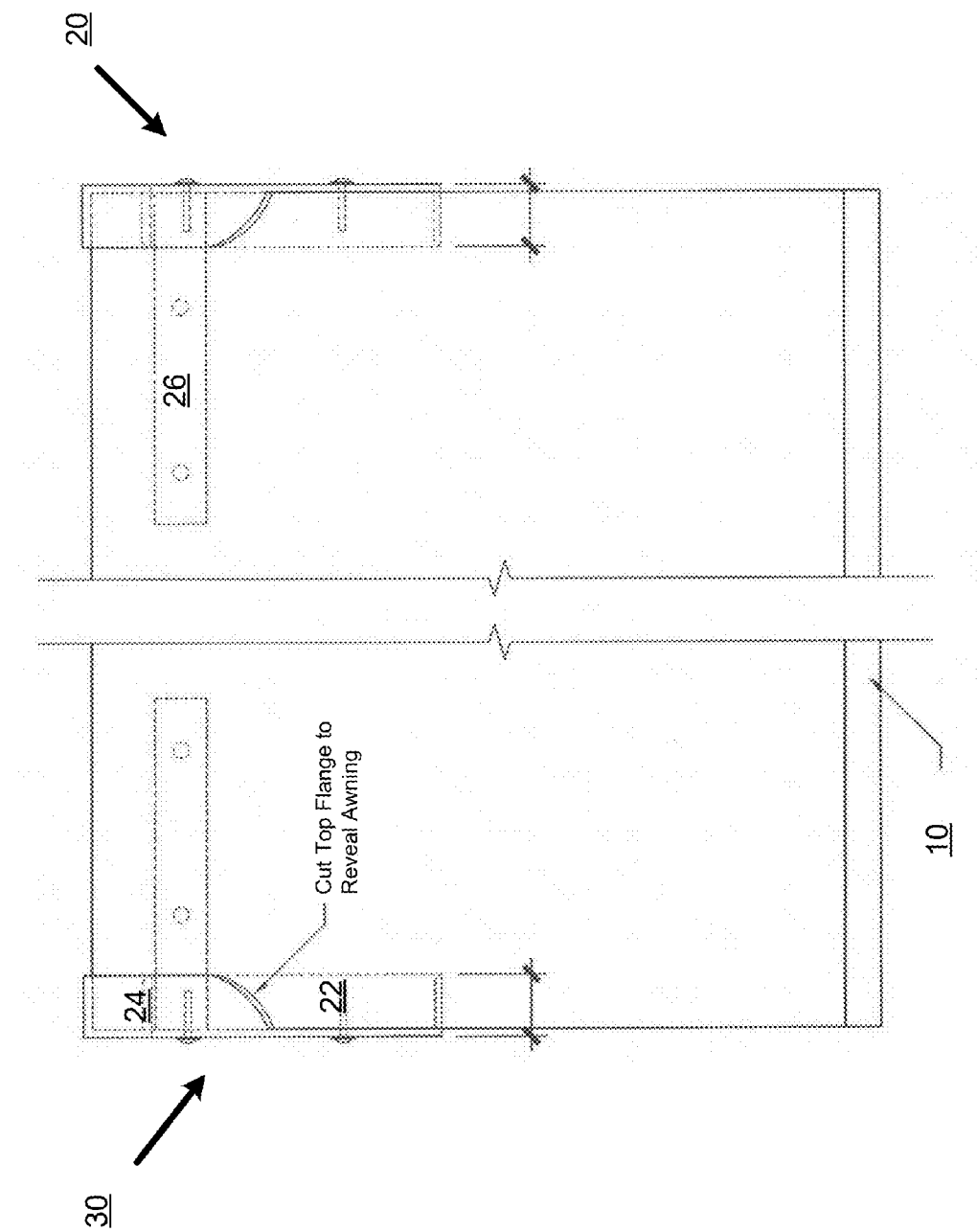
Figure 4:
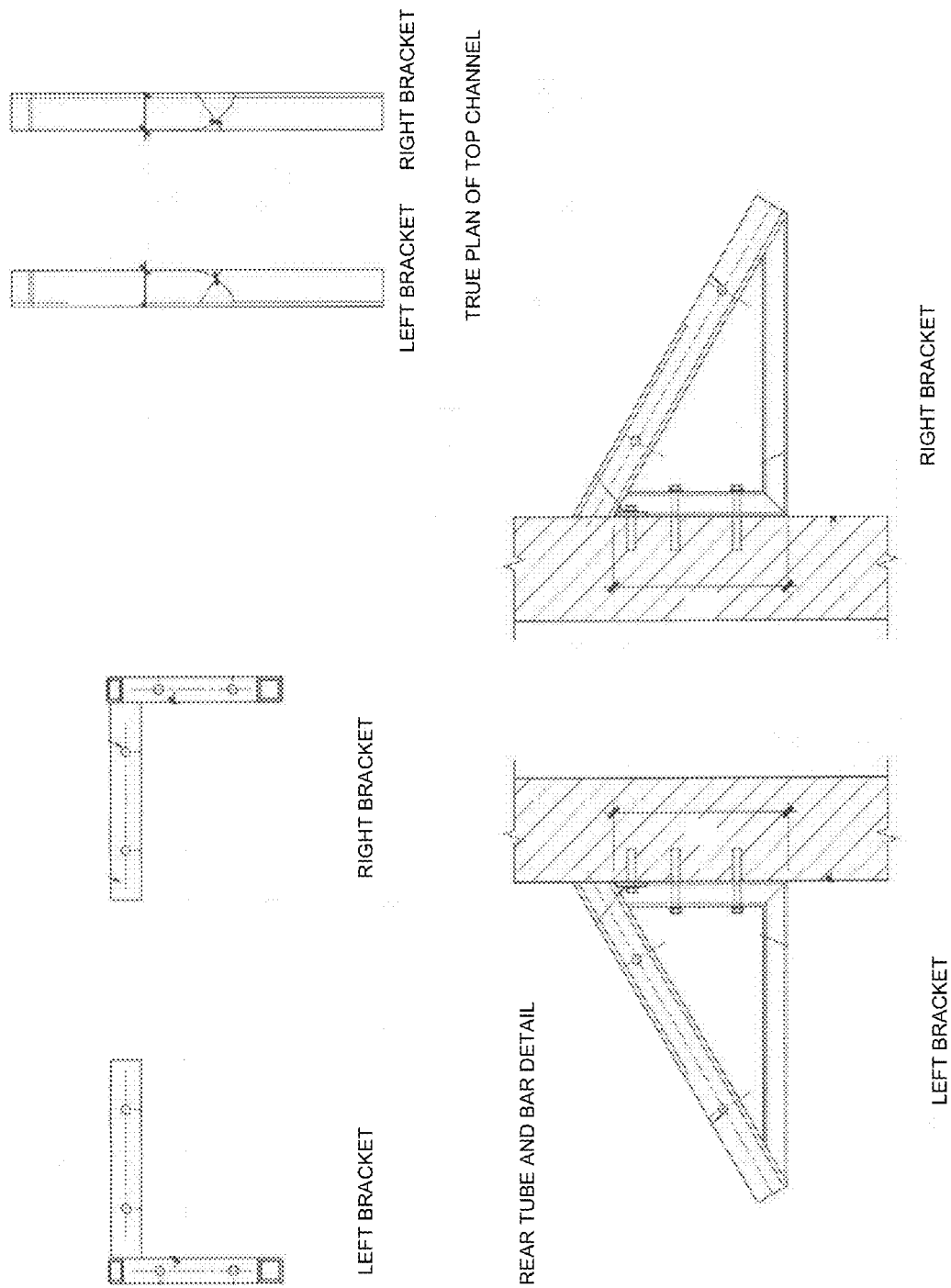
Figure 5:
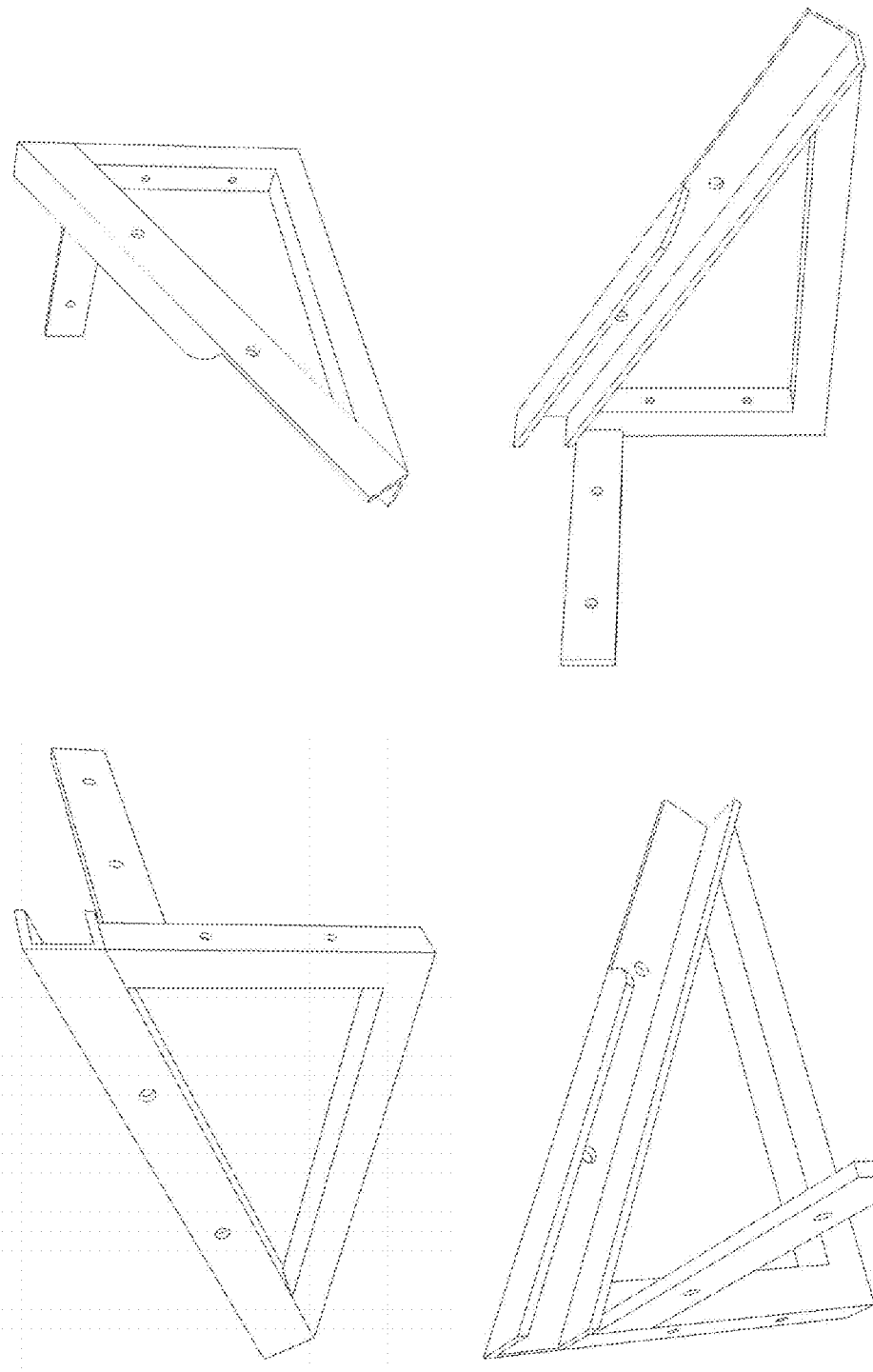
Figure 6:
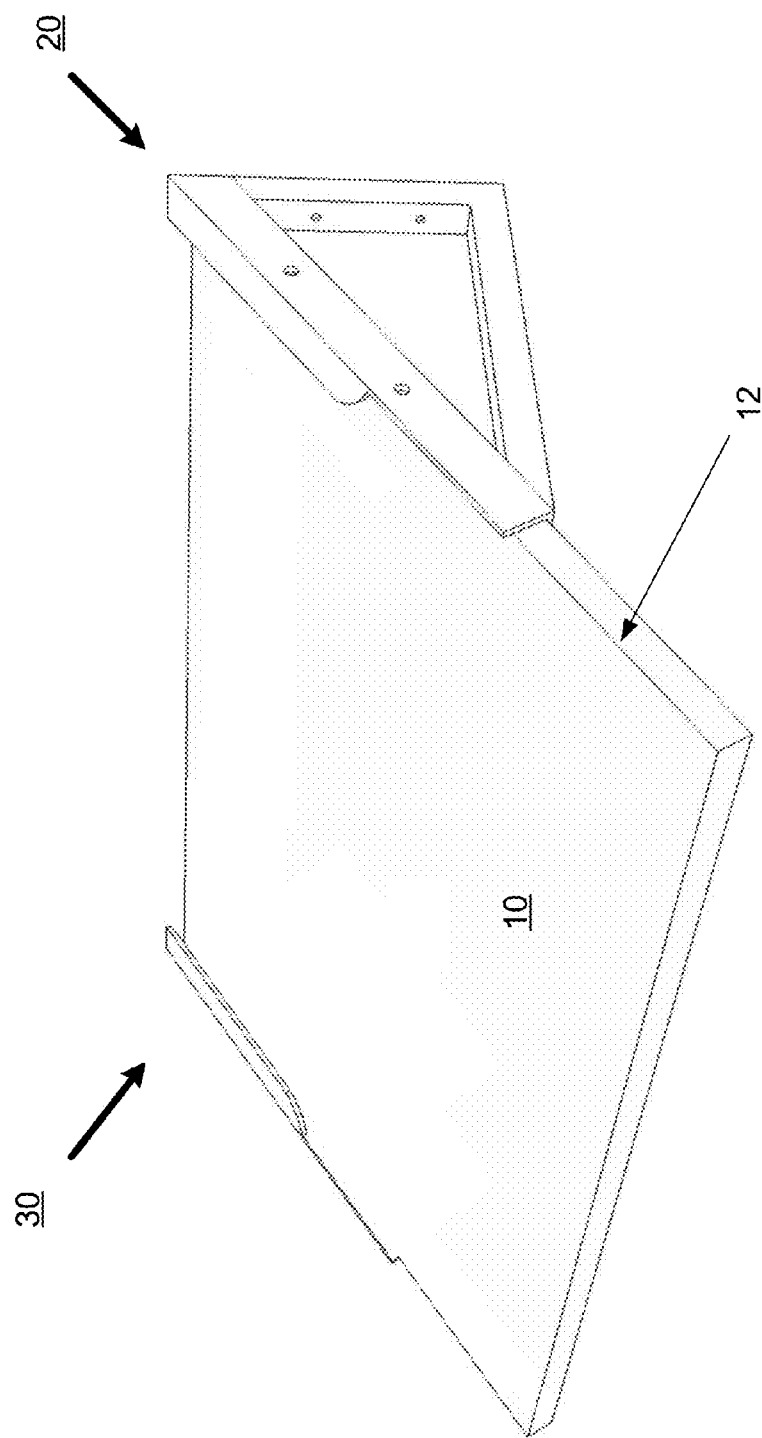
Figure 7:
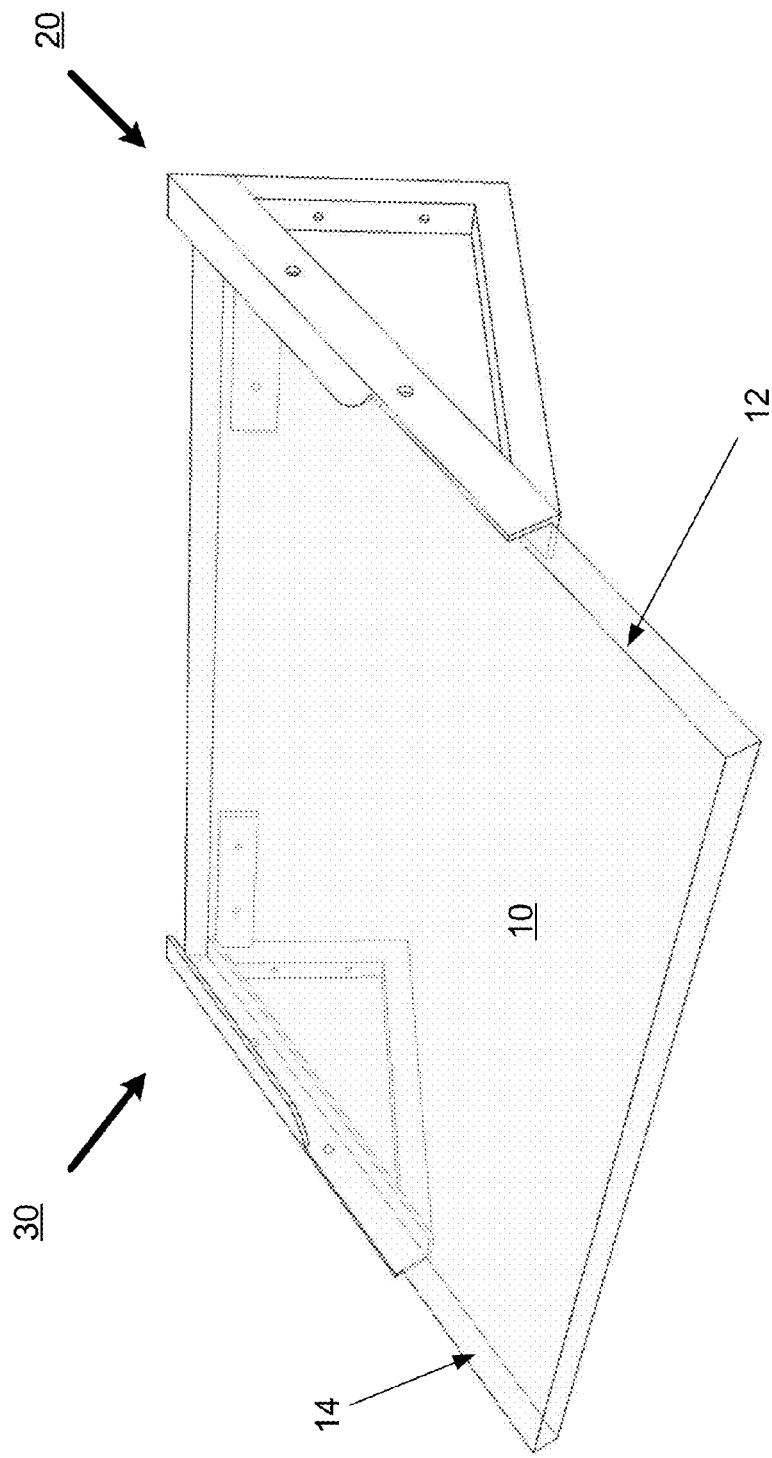
Figure 8:
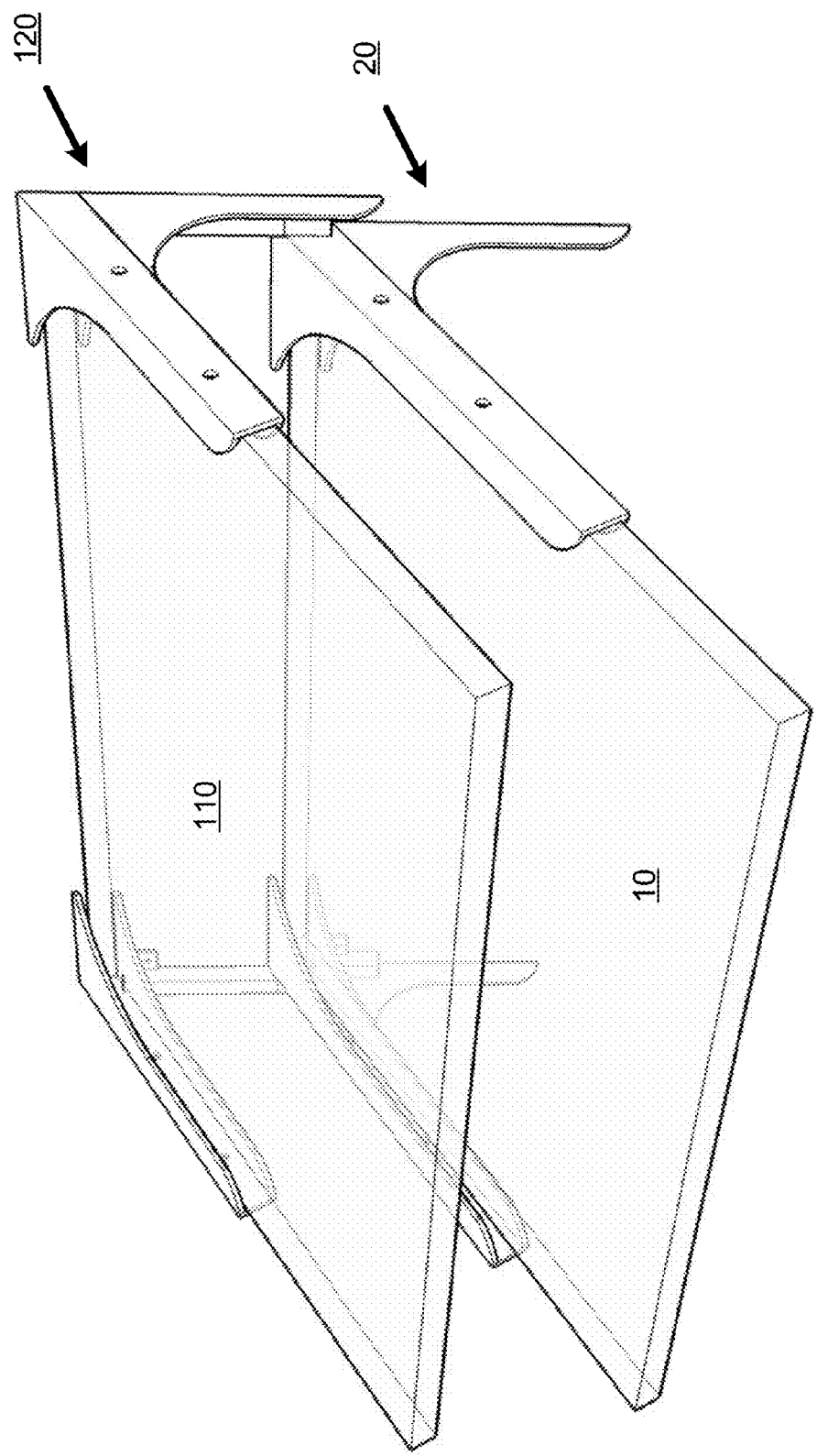
FIGS. 8 through 19 show views of double awning brackets in accordance with another embodiment of the present invention.
Figure 9:
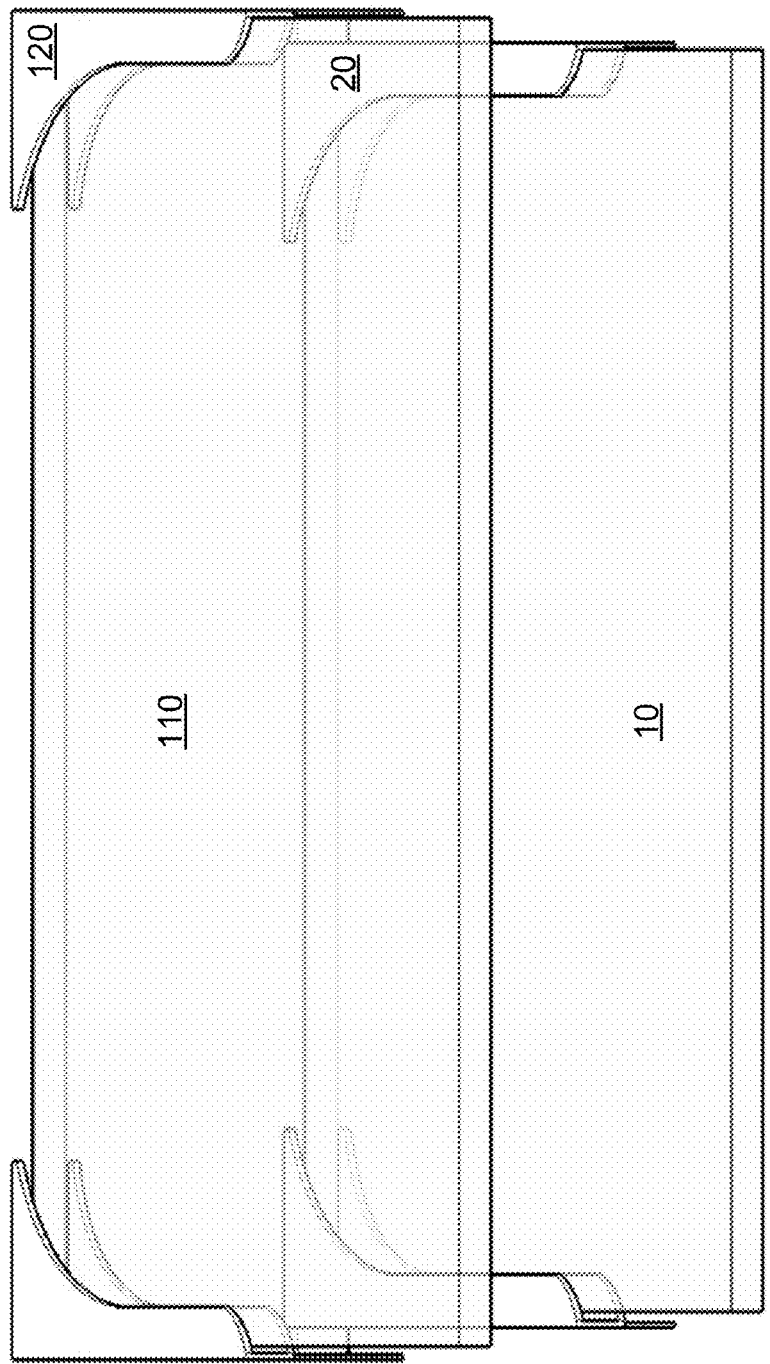
Figure 10:
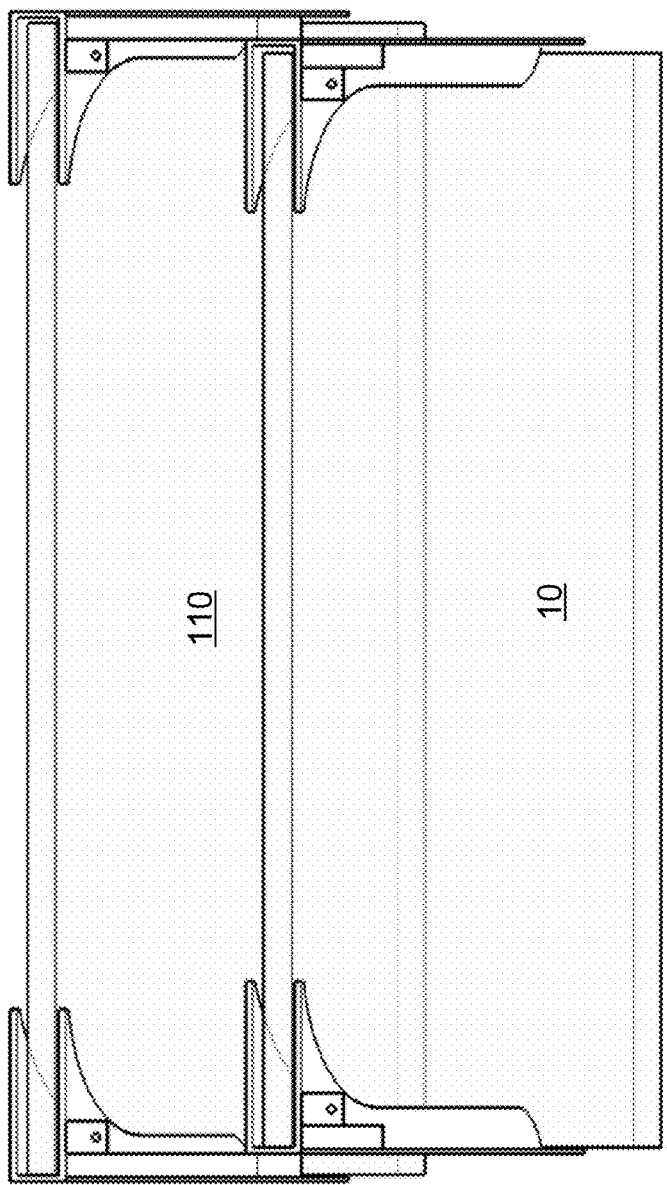
Figure 11:
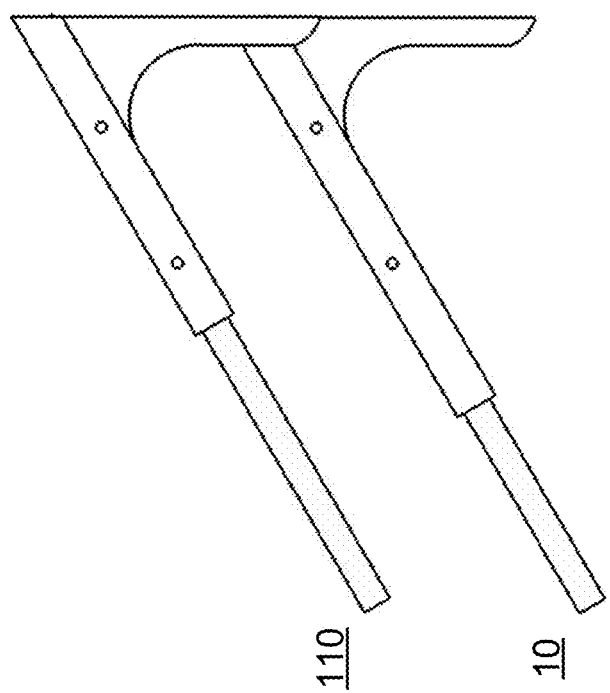
Figure 12:
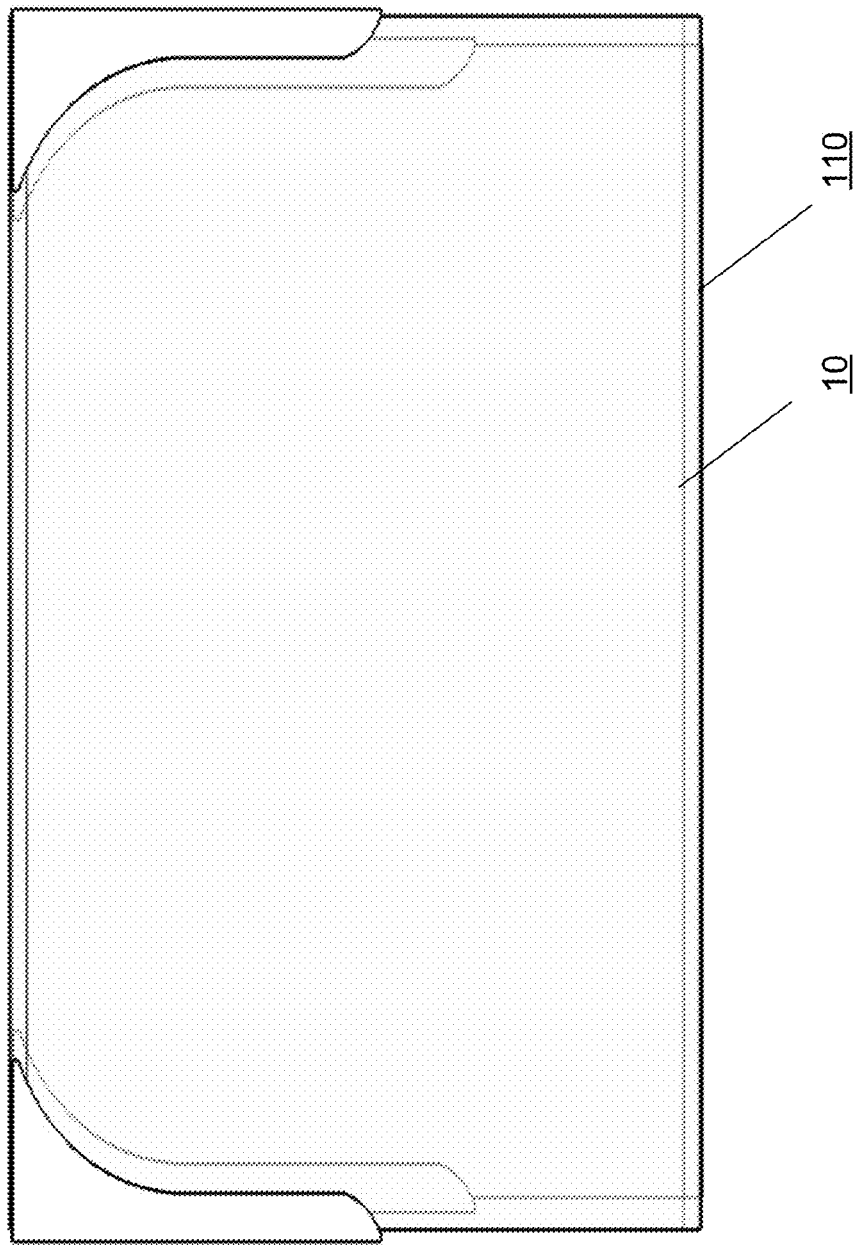
Figure 13:
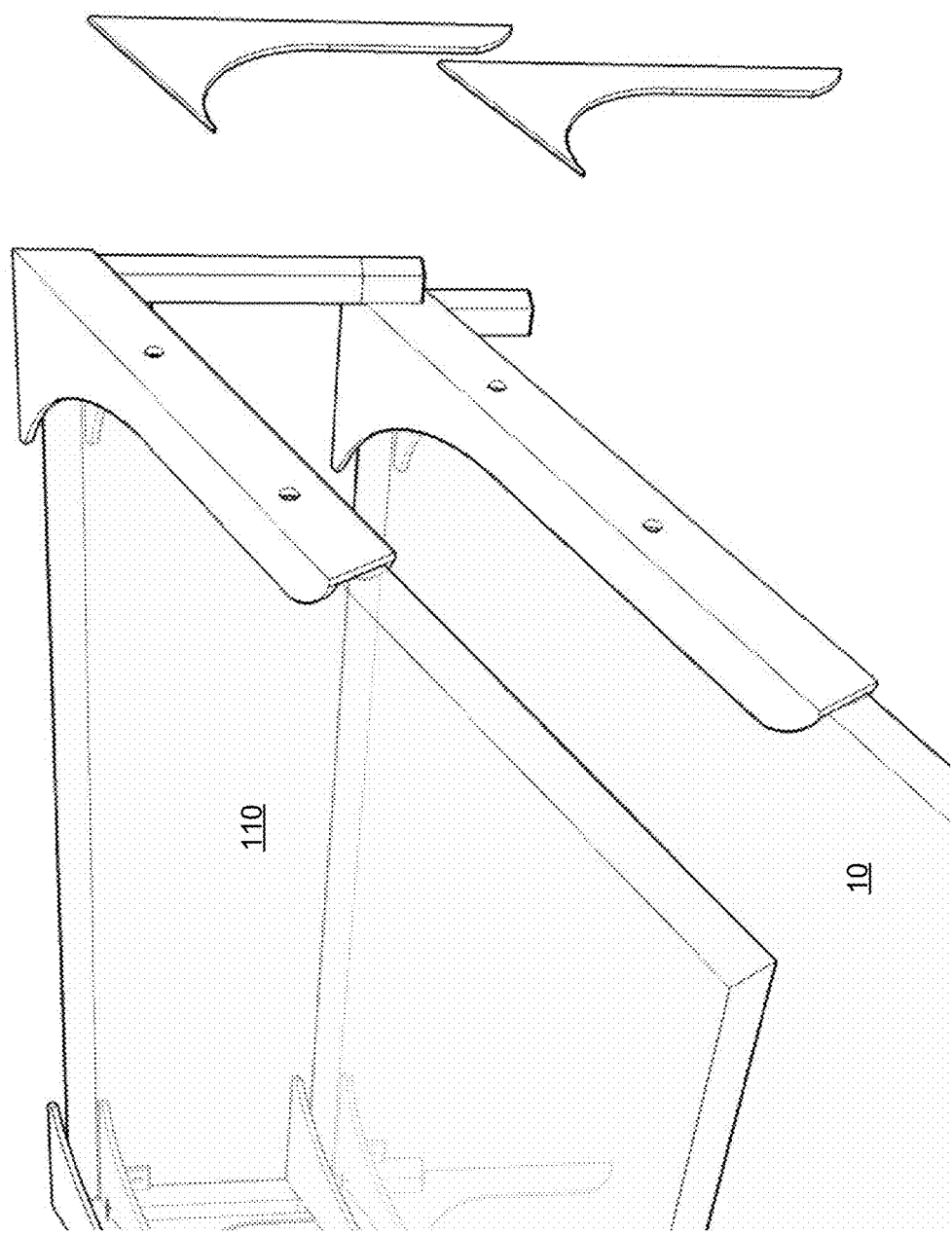
Figure 14:
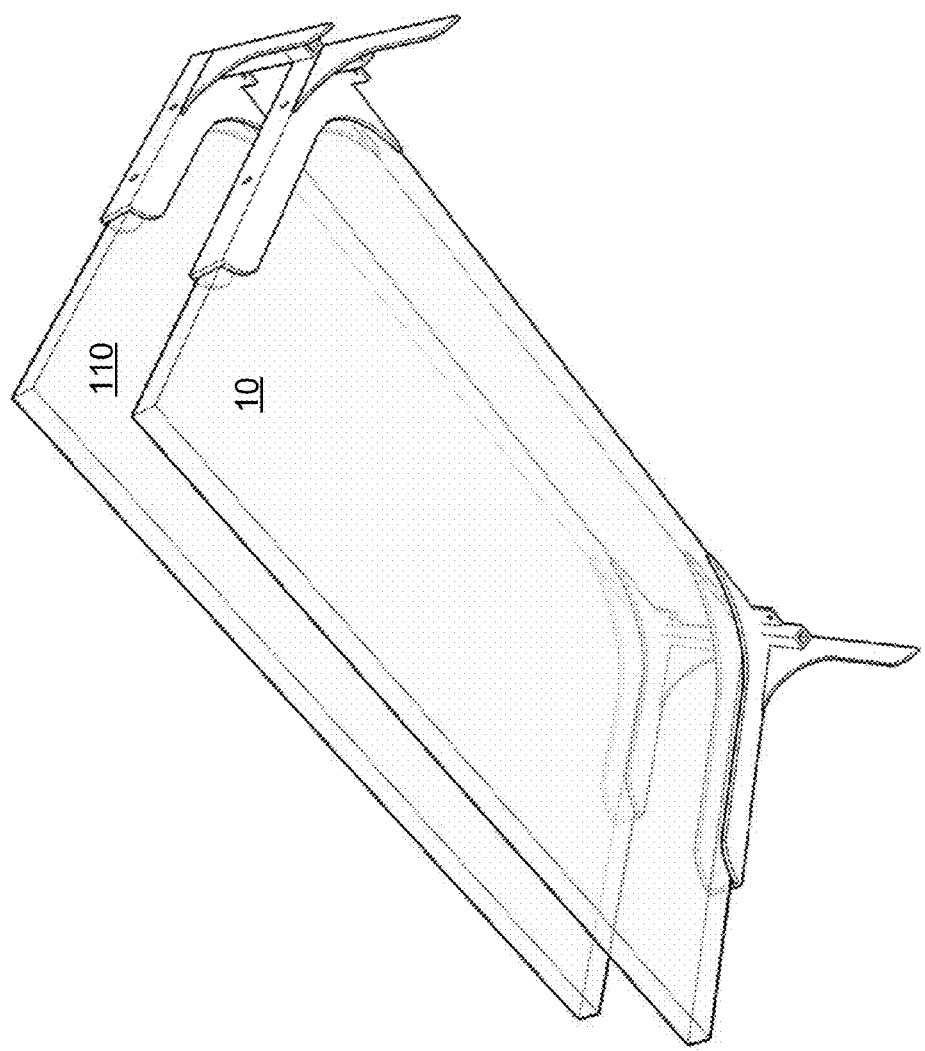
Figure 15:
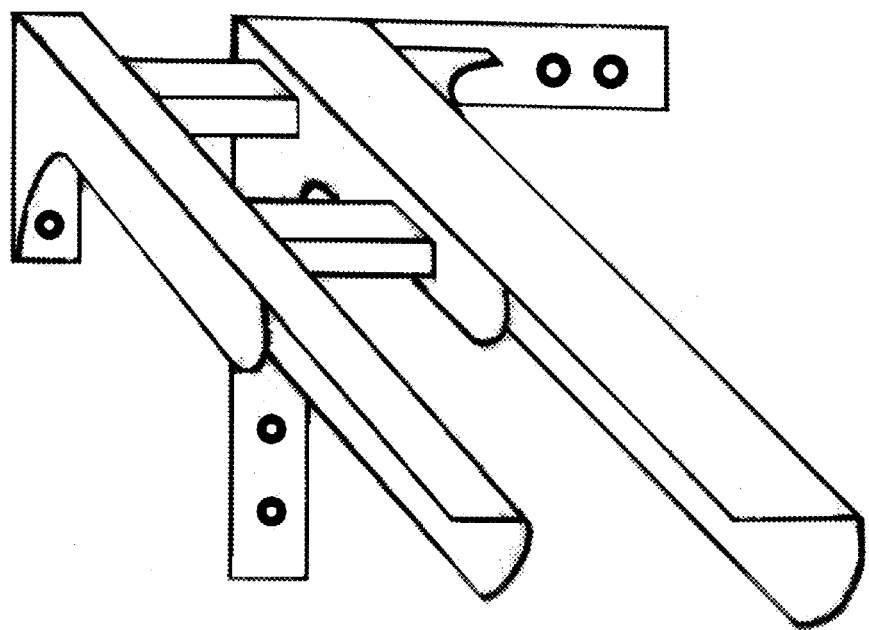
Figure 16:
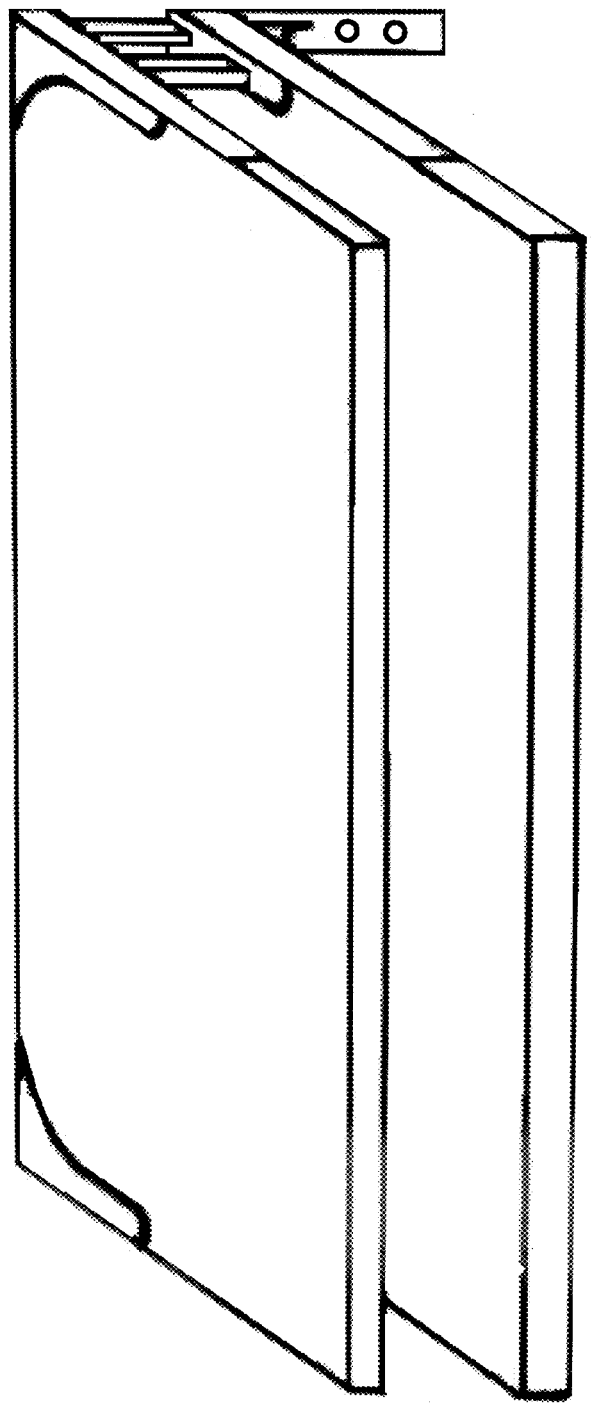
Figure 17:
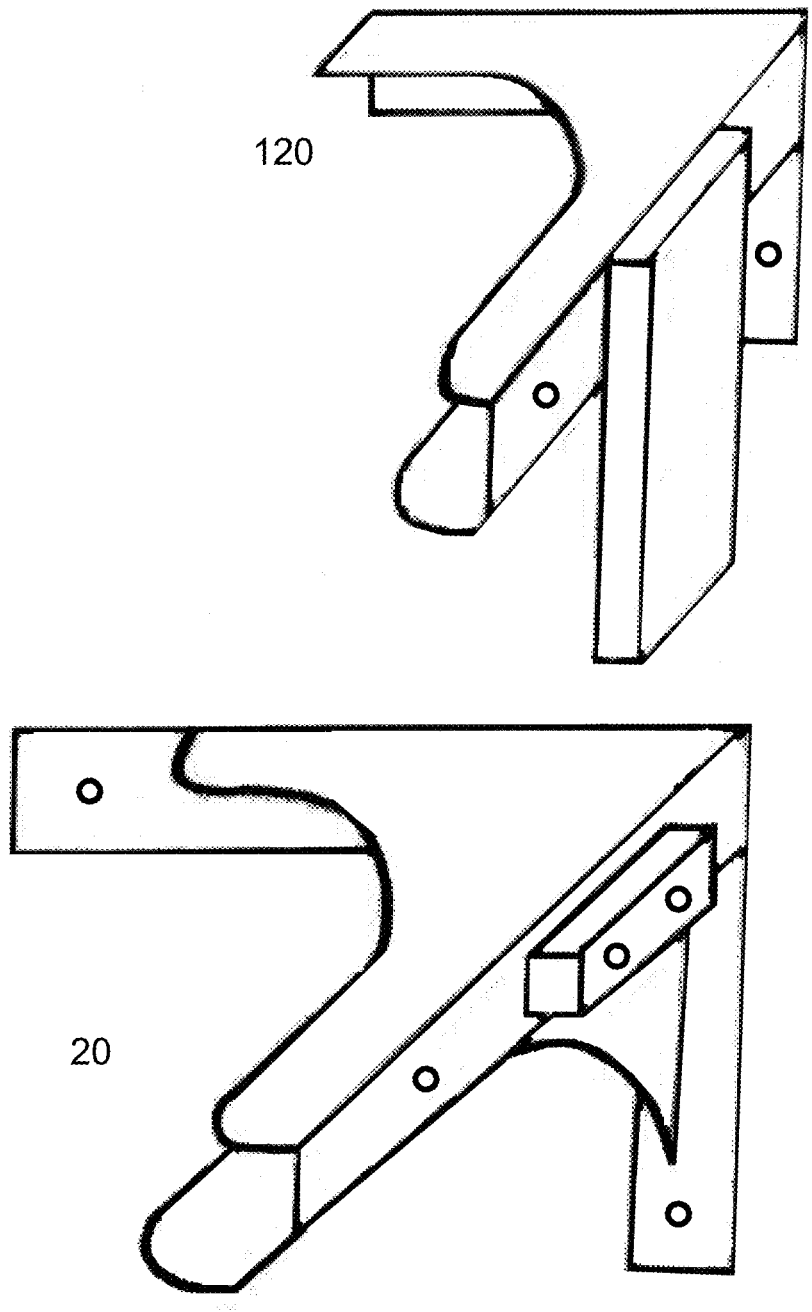
Figure 18:
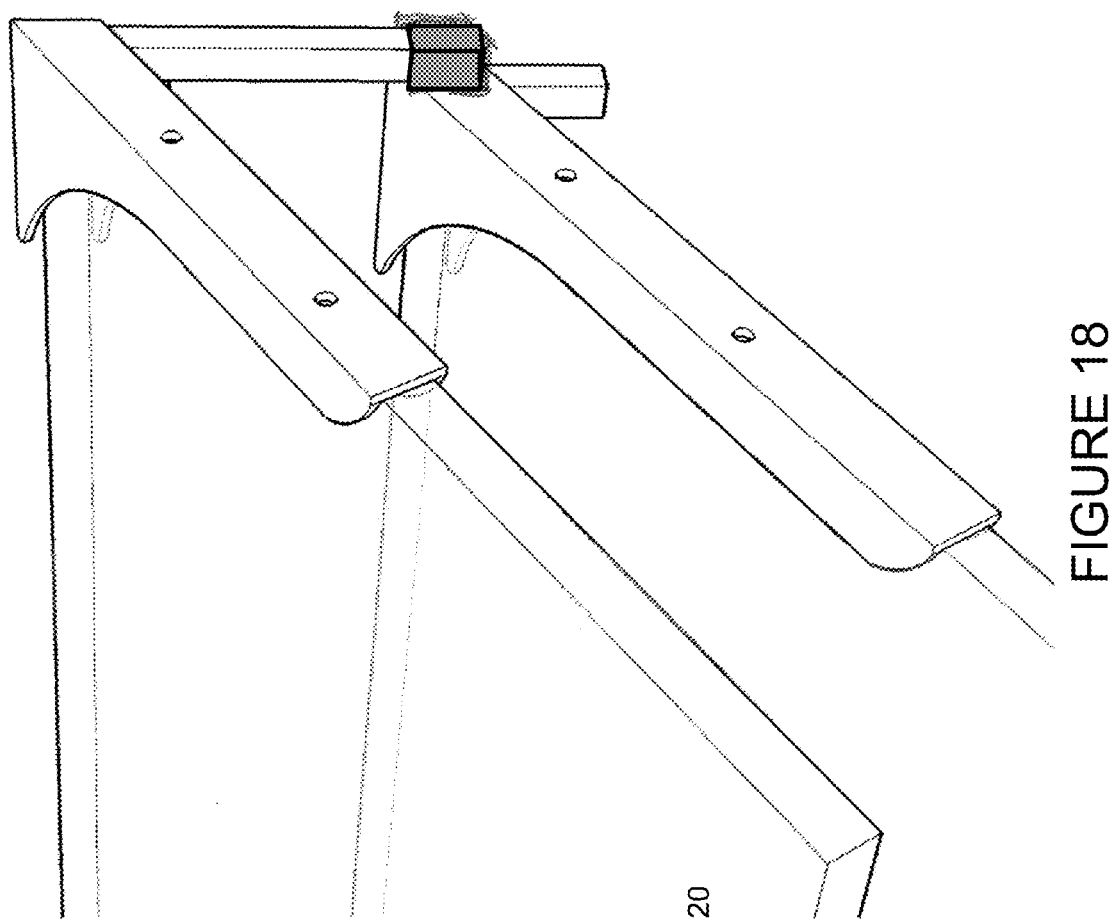

In one exemplary embodiment, as seen in FIGS. 1-7, the present invention comprises an apparatus and related methods to removably install, or replace, an awning. In one exemplary embodiment, the awning comprises a panel 10. The panel may be made of canvas, vinyl, plastic, metal, aluminum, wood, glass, tempered glass, vinyl siding, shaker shingles, thatched roofing, wire, or other suitable material. The panel may be colored, translucent, painted, or otherwise decorated, and may include logos, words, names, pictures, graphics, or the like. In one embodiment, a picture or other image may be printed onto a vinyl panel and transferred to an awning frame for mounting as described below. In yet another embodiment, the panel may be transparent or translucent (e.g., glass), and graphics may be removably placed on the panel with a Mylar film or similar film or material.

In a typical embodiment, the panel is stretched (if made of a stretchable material) and mounted on a frame, although where the panel is made of inflexible materials, such as glass or wood, a frame may be used but may not be needed. The exact configuration of the frame varies according to the dimensions and characteristics of the panel, but generally comprises at least a rectangular shape with supporting members 12, 14 (such as rods, beams, or poles) extending along or near the sides of the panel. In one embodiment, supporting members 12, 14 extend only along the right and left side of the panel.

In the embodiment shown, the awning is mounted on a wall or similar vertical surface by insertion into a pair of mounting brackets 20, 30 that have been affixed to the wall. The mounting brackets may be mounted at any distance apart, and thus may accommodate awnings of different sizes. The mounting brackets comprise a right 20 and left 30 bracket. In the embodiment shown, each mounting bracket 20, 30 is a mirror image of the other.

In one embodiment, a mounting bracket comprises an angled support arm 22. All or a portion of the support arm (e.g., the upper part of the support arm) may be covered or topped with a holding piece or member 24. The holding piece may be an open or closed triangular piece, or a rod or similar member extending from the support arm 22. The supporting members 12, 14 along the sides of the awning panel 10 slide into the space or slot formed by the angled support arm 22 and the holding piece 24, and is further supported by the angled support arm 22 extending along the underside of the supporting members 12, 14. The holding piece 24 may be integral with the support arm 22.

Figure 19:
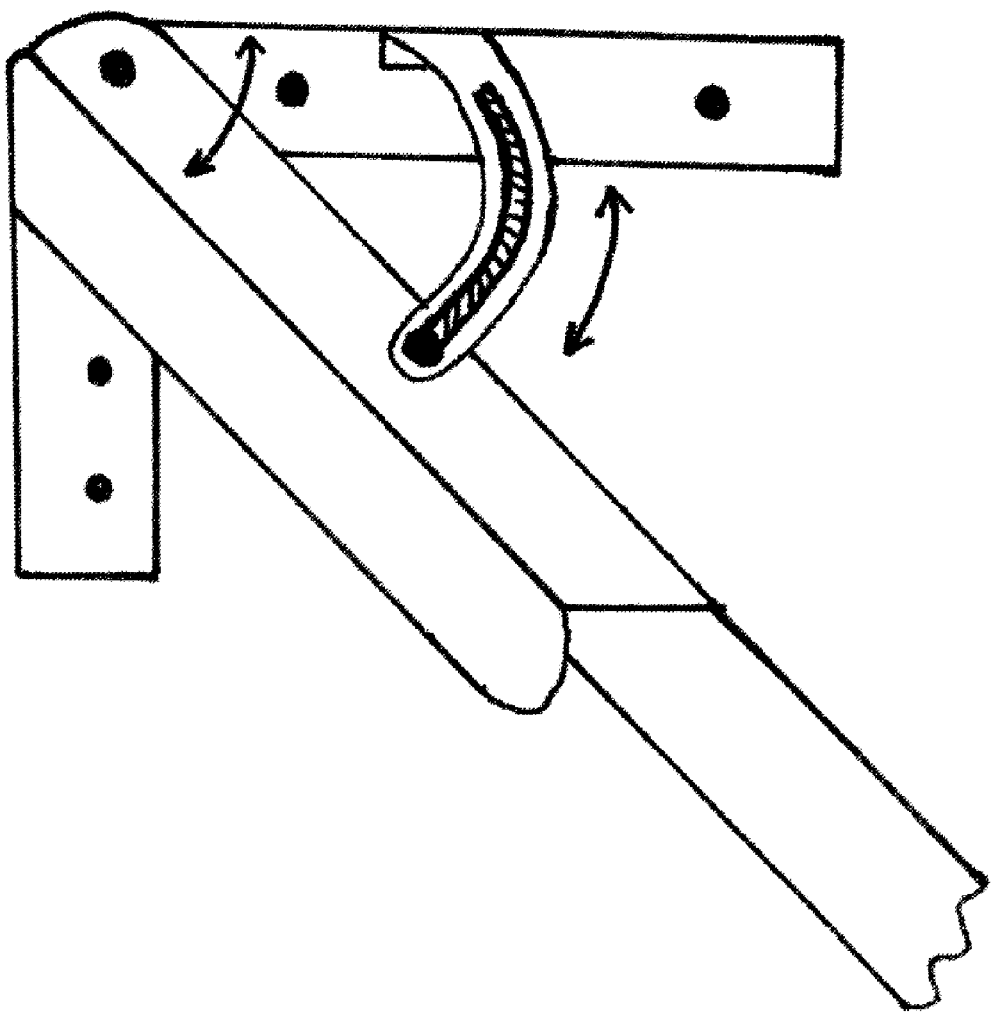

In one embodiment, the angled support arm 22 is fixed at a set angle, as seen in FIG. 1. The angle may vary. In another embodiment, as shown in FIG. 19, the support arm can be moved or adjusted to different angles, including up to 90 degrees, or beyond.

The awning panel 10 may be held in place after insertion by any acceptable means, including, but not limited to, a spring lock inserted in a hole on the side of the support arm and into a hole of the panel frame. Alternatively, a spring or pressure mechanism along the inside of the support arm may be used, or a lining. In one exemplary embodiment, a rubber lining or strip may be used for a tight fit with the panel. The awning panel 10 may be removed by reversing any holding mechanism, and drawing the panel out of the brackets 20, 30.

In one exemplary embodiment, the mounting bracket further comprises a top support 26 extending horizontally along the wall or vertical surface, above the door, window or space under the panel. A plurality of holes may be located in the top support for mounting to the wall or vertical surface.

The mounting bracket may further comprise a vertical support 28 extending vertically down the wall or vertical surface, alongside the door, window or space under the panel. A plurality of holes may be located in the vertical support for mounting to the wall or vertical surface. A brace support 30 extending between the vertical support 28 and the angled support arm 22 may be used to provide additional support. The brace support 30 may be a bar, rod or other piece extending from the vertical support to the angled support arm.

Awnings often start fading within months after being exposed to intense summer sun and heat, regardless of the material from which the awning panel is made. Thus, another exemplary embodiment comprises a non-fading cover shield placed above the awning, shading the awing material underneath and preventing premature fading. During winter months or other times with less sun or heat, the cover shield can be removed.

FIGS. 8-18 show embodiments of a double pair of mounting brackets, right side and left side. The right side pair of brackets comprises an awning mounting bracket 20 for the awning panel, as described above, with a cover mounting bracket 120 affixed to the wall or vertical surface above the awning mounting bracket. The configuration of the cover mounting bracket is similar to the awning mounting bracket, with an angled support with a holding piece. The cover shield 110 is inserted into the cover mounting brackets in the manner described for awnings above.

The cover mounting bracket may be affixed to the wall or vertical surface separately from the awning mounting bracket. In an alternative embodiment, the cover mounting bracket may be placed directly above the corresponding awning mounting bracket. In yet another exemplary embodiment, the cover mounting bracket is offset from the awning mounting bracket. The cover shield may be larger than the awning and extend over the awning on the sides. In another exemplary embodiment, the cover mounting bracket may be affixed, connected to, or supported by the awning mounting bracket. The cover mounting bracket may be integrated with the awning mounting bracket, or it may fit into a receiving cup, slot, or holder.

In yet another embodiment, multiple brackets may be used, so that two, three, or more awning panels can be mounted over each other, in whole or in part (i.e., stacked vs. offset or overlapping). As with the double brackets, the brackets on one side may be separate, detachably connected, or integrated.

The brackets may be sold separately from each other or from awning panels. Once installed, the user can then easily install and replace awnings as desired. The user can have cheap and inexpensive replacement awnings manufactured easily, such as a thin vinyl that can be stretched over a frame. The awning panel being removed can be removed from its frame, and the frame used with the new awning panel. The cover shield also may be removed and replaced in a similar manner to the awning.

According, the present invention in various embodiments provides a way to inexpensively install awnings and covers in a variety of locations. Awning frames can be manufactured in quantity, with independent brackets, thereby avoiding the need to custom build each frame, as in the prior art. An average awning frame can be manufactured for $30 or less in some locations. Panels can be quickly and easily changed out by a home or business owner, without the need to change brackets. Thus, a user can change a darker color awning (suitable for winter) to a lighter color awning (suitable for summer, as darker colors more quickly fade during summer heat). The cover panel can be used during summer months as well to deter fading of the awning beneath it.

With panels being easily removed and placed on a frame, awning panels can easily be changed frequently to prevent excessive weathering. Panels can also be swapped between users, providing the frame width is the same. It also provides for easy changing of the actual panel material from time to time. This adds variety by allowing for frequent color, name, or image changes (thereby making it easy to change the awning to match the new paint or decor for a home or business), and makes it easy to clean the panel. This can double the life of the awning panel, thereby reducing maintenance and replacement costs. It also forestalls the need for frequent recovering of the awning as practiced in the prior art, the cost of which is comparable to the original cost of the awning.

The quick and easy removal of the panel also is of benefit in several other situations. Awnings can be quickly moved from one doorway or window to another. Another example is cleaning the awning. The awning can be cleaned more often, thereby preventing build-up of dirt and mold and increasing awning life. The awning panel can also be quickly and easily removed when intense weather is imminent (such as a hurricane, thunderstorm or hailstorm), thereby avoiding the expense of replacing awnings that are destroyed or damaged during such weather. Another example is easy removal of the awning during painting or repair of the house or building; painters seldom cover up awnings and frequently drop paint on the awning, where it can permanent stain the awning (particularly canvas awnings). Similarly, tools or materials dropped while performing repairs in the area of the awning can easily land on and damage the awning.

With several embodiments of the present invention, the homeowner or business owner can install their own awnings. The brackets and installation kits (e.g., wall bolts or screws, or the like) can be purchased at a hardware store, home supply store, or similar retailer. Installation of a set of brackets and insertion or sliding of the awning panel into place for a typical installation can be accomplished in an hour or less. Similarly, other non-traditional awning companies, such as home improvement companies, metal building fabrication companies, general contractors, siding manufacturers and installers, and the like, can enter the awning market by using the same brackets and installation materials.

The present invention also works with more rigid panel materials, which can be used with or without a frame. A panel made of metal (e.g., copper, tin, aluminum, or the like), glass, solid wood, wood shutter, decorative iron rod, or the like, can also be inserted into the bracket for a different look. These materials also are more durable, less prone to damage, and have a longer life. A snow-resistant material also may be preferred during winter months, and the awning panel can be easily changed out in a matter of minutes. Replacement panels can be easily stored (and a awning business may provide storage and changing out of awning panels for customers).

The panels also allow for more creative and frequent advertising and customer communication techniques, beyond the normal company name or logo. Panels can be quickly made and installed with current advertising on them, sales, monthly specials, and the like. The panels also can be imprinted with artwork, personal photographs, university and corporate logos, sports team logos, flags, and other graphics. For example, a veterinary facility may have several different awning panels printed with photographs of certain cats or dogs that they have treated.

In yet another embodiment, the panel may be more structured, and include electronics, lights, and the like. For example, a glass panel can be backlit or just colored with lights. Neon lighting and the like may also be incorporated into an awning panel. Further, the panel may be an electric solar panel, electrically connected to a battery or storage facility The above disclosed invention has a number of particular features which should preferably be employed in combination although each is useful separately without departure from the scope of the invention. While we have shown and described the preferred embodiments of our invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. An awning system, comprising:
   at least two awning support brackets, adapted to detachably hold two or more sides or corners of an awning panel, wherein the awning panel can be easily inserted into and removed from the support brackets, each bracket comprising:
   an angled support arm with an upper and a lower end;
   a holding member covering all or a portion of the upper end of the angled support arm, thereby creating a space between the angled support arm and the holding member adapted to receive and hold an awning panel support member;
   a vertical support member with an upper end and a lower end, at least the upper end of the vertical support member affixed to the upper end of the angled support arm; and
   a horizontal top support member with a first end and a second end, the first end affixed to the upper end of the angled support arm.

2. The awning system of claim 1, wherein the awning panel is rigid.

3. The awning system of claim 1, wherein the awning panel comprises an awning frame with a covering mounted on said frame.

4. The awning system of claim 3, wherein the awning frame comprises at least two awning panel support members adapted to be inserted into the awning support brackets.

5. The awning system of claim 4, wherein the awning panel support member is secured in place.

6. The awning system of claim 3, wherein pictures, logos, words, symbols, images, or other graphics are displayed on at least one side of the covering.

7. The awning system of claim 1, further comprising a cover panel mounted above the awning panel.

8. The awning system of claim 7, wherein the cover panel is mounted on a pair of brackets separate from the pair of awning brackets.

9. The awning system of claim 1, wherein the awning panel comprises a solar panel.

10. The awning system of claim 1, wherein the awning panel comprises a wood panel.

11. The awning system of claim 1, wherein the awning panel comprises vinyl.

12. The awning system of claim 1, wherein the awning panel comprises a glass panel.

13. The awning system of claim 1, wherein the awning panel comprises shaker shingles or thatched roofing.

\* \* \* \* \*